United States Patent [19]

Tsutsui et al.

[11] Patent Number: 5,340,786

[45] Date of Patent: Aug. 23, 1994

[54] OLEFIN POLYMERIZATION CATALYST AND PROCESS FOR THE POLYMERIZATION OF OLEFINS

[75] Inventors: Toshiyuki Tsutsui; Kazunori Okawa; Akinori Toyota, all of Kuga, Japan

[73] Assignee: Mitsui Petrochemical Industries, Ltd., Tokyo, Japan

[21] Appl. No.: 151,765

[22] Filed: Nov. 15, 1993

Related U.S. Application Data

[63] Continuation of Ser. No. 895,168, Jun. 5, 1992, abandoned, which is a continuation of Ser. No. 304,199, Jan. 31, 1989, abandoned.

[30] Foreign Application Priority Data

Feb. 12, 1988 [JP] Japan .................................. 63-31414
Feb. 26, 1988 [JP] Japan .................................. 63-43671

[51] Int. Cl.$^5$ ........................ C08F 4/648; C08F 10/00
[52] U.S. Cl. .................................. 502/117; 502/103; 502/111
[58] Field of Search .................. 502/103, 111, 117

[56] References Cited

U.S. PATENT DOCUMENTS

| | | | |
|---|---|---|---|
| 2,952,670 | 9/1960 | Fischer | 526/352 |
| 3,242,099 | 3/1966 | Manyik et al. | 526/165 |
| 3,440,237 | 4/1969 | Mottus | 526/138 |
| 4,542,199 | 9/1985 | Kaminsky et al. | 526/165 |
| 4,680,353 | 7/1987 | Ishihara et al. | 526/165 |
| 4,791,180 | 12/1988 | Turner | 526/166 |

FOREIGN PATENT DOCUMENTS

| | | |
|---|---|---|
| 0363029 | 4/1990 | European Pat. Off. . |
| 2608863 | 9/1977 | Fed. Rep. of Germany . |
| 60-260602 | 12/1985 | Japan .................... 526/160 |

OTHER PUBLICATIONS

English translation only furnished.

*Primary Examiner*—Edward J. Smith
*Attorney, Agent, or Firm*—Sherman and Shalloway

[57] ABSTRACT

In accordance with the present invention, there are provided an olefin polymerization catalyst formed from:

[A] a compound of a transition metal belonging to Group IV B of the periodic table,
[B] an aluminoxane, and
[C] water, an olefin polymerization catalyst formed from [D] an organoaluminum compound in addition to the above-mentioned [A], [B] and [D] components, and processes for the polymerization of olefins using the above-mentioned olefin polymerization catalysts, respectively.

8 Claims, No Drawings

OLEFIN POLYMERIZATION CATALYST AND PROCESS FOR THE POLYMERIZATION OF OLEFINS

This application is a continuation of application Ser. No. 07/895,168, filed Jun. 5, 1992; which is a continuation of application Ser. No. 07/304,199, filed Jan. 31, 1989, both now abandoned.

FIELD OF THE INVENTION

This invention relates to olefin polymerization catalysts and particularly to olefin polymerization catalysts having excellent polymerization activities and capable of giving olefin polymers having a high molecular weight. More particularly, the invention relates to olefin polymerization catalysts which are capable of giving olefin polymers having a narrower molecular weight distribution when homopolymers of olefins are intended to be prepared, and which are capable of giving olefin copolymers having a narrower molecular weight distribution and a narrower composition distribution when copolymers of two or more olefins are intended to prepare.

In another aspect, this invention relates to a process for the polymerization of olefins using such olefin polymerization catalysts as mentioned above.

BACKGROUND OF THE INVENTION

It has heretofore been known that $\alpha$-olefin polymers, in particular, ethylene polymers, or ethylene/$\alpha$-olefin copolymers are prepared by processes wherein ethylene is polymerized or ethylene and $\alpha$-olefin are copolymerized in the presence of a titanium based catalyst composed of a titanium compound and an organoaluminum compound, or a vanadium based catalyst composed of a vanadium compound and an organoaluminum compound.

Generally, ethylene/$\alpha$-olefin copolymers obtained with the titanium based catalysts have a broad molecular weight distribution and are poor in transparency, surface non-tackiness and dynamical properties. Ethylene/$\alpha$-olefin copolymers obtained with the vanadium based catalysts have a narrower molecular weight distribution and a narrower composition distribution in comparison with the ethylene/$\alpha$-olefin copolymers obtained with the titanium based catalysts, and show a fairly good improvement in transparency, surface non-tackiness and dynamical properties, but said ethylene/$\alpha$-olefin copolymers are found to be insufficient for practical purposes wherein such properties are required. Therefore, it is desired that ethylene/$\alpha$-olefin copolymers further improved in these properties are developed to make their appearance.

Under such circumstances, on the one hand, there have been proposed recently processes for the preparation of ethylene/$\alpha$-olefin copolymers using catalysts composed of zirconium compounds and aluminoxanes as a new type of Ziegler catalysts for olefin polymerization.

For example, Japanese L-O-P Publn. No. 19309/1983 discloses a process for the preparation of ethylene/$\alpha$-olefin copolymers, which process comprises polymerizing ethylene and one or at least two $C_3$–$C_{12}$ $\alpha$-olefins at a temperature of from $-50°$ C. to $200°$ C. in the presence of a catalyst composed of a transition metal-containing compound represented by the following formula

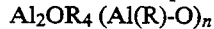
(Cyclopentadienyl)$_2$MeRHal wherein R is cyclopentadienyl, $C_1$–$C_6$ alkyl or halogen, Me is a transition metal, and Hal is halogen, and a linear aluminoxane represented by the following formula
$Al_2OR_4$ (Al(R)-O)$_n$ wherein R is methyl or ethyl, and n is a number of 4 to 20, or a cyclic aluminoxane represented by the following formula

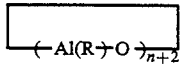

wherein R and n are as defined above. This patent L-O-P publication teaches that in order to regulate the density of the resulting polyethylene, the polymerization of ethylene should be carried out in the presence of small quantities of up to 10% by weight of fairly long chain $\alpha$-olefins or mixtures thereof.

Japanese Patent L-O-P Publn. No. 95292/1984 discloses an invention relating to processes for preparing a linear aluminoxane represented by the following formula

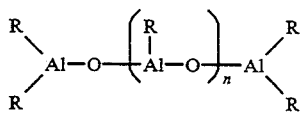

wherein n is a number of from 2 to 40, and R is $C_1$–$C_6$ alkyl, and a cyclic aluminoxane represented by the following formula

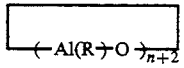

wherein n and R are as defined above.

This patent L-O-P publication describes that when the polymerization of ethylene is carried out in the presence of a mixture comprising the aluminoxane prepared by the process of said publication, for example, methyl aluminoxane, and a bis(cyclopentadienyl)zirconium compound or a bis(cyclopentadienyl)titanium compound) there are obtained at least twenty-five million grams of polyethylene per 1 g of the transition metal and per 1 hour.

Japanese Patent L-O-P Publn. No. 35005/1985 discloses a process for preparing olefin polymerization catalyst, which comprises first reacting an aluminoxane compound represented by the following formula

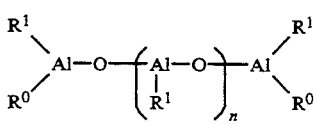

wherein $R^1$ is $C_1$–$C_{10}$ alkyl, and $R^0$ is $R^1$, or $R^0$ represents
—O— by linkage, with a magnesium compound, and then chlorinating the reaction product, followed by treatment with a compound of Ti, V, Zr or Cr. This patent L-O-P publication describes that the catalysts prepared by the process are particularly suitable for use in copolymerization of ethylene and $C_3$–$C_{12}$ α-olefins.

Japanese Patent L-O-P Publn. No. 35006/1985 discloses a combination of (a) two or more dissimilar mono-, di- or tri-cyclopentadienyls or their derivatives of transition metals and (b) an aluminoxane as a catalyst for preparation of reactor blended polymers. Example 1 of this patent L-O-P publication discloses that ethylene and propylene are polymerized in the presence of a catalyst composed of bis(pentamethylcyclopentadienyl)dimethyl zirconium and an aluminoxane to obtain polyethylene having a number average molecular weight of 15,300, a weight average molecular weight of 36,400 and containing 3.4% of the propylene component. In Example 2 of this patent L-O-P publication, ethylene and propylene are polymerized in the presence of a catalyst composed of bis(pentamethylcyclopentadienyl)zirconium dichloride, bis(methylcyclopentadienyl)zirconium dichloride and an aluminoxane to obtain a blend of polyethylene and an ethylene/propylene copolymer consisting of a toluene-soluble portion having a number average molecular weight of 2,200 and a weight average molecular weight of 11,900 and containing 30 mol % of the propylene component and a toluene-insoluble portion having a number average molecular weight of 3,000 and a weight average molecular weight of 7,400 and containing 4.8 mol % of the propylene component, said blend having a number average molecular weight of 2,000 and a weight average molecular weight of 8,300 and containing 7.1 mol % of the propylene component. Similarly, Example 3 discloses a blend of LLDPE and an ethylene/propylene copolymer consisting of a soluble portion having a molecular weight distribution ($\overline{Mw}/\overline{Mn}$) of 4.57 and containing 20.6 mol % of the propylene component and an insoluble portion having a molecular weight distribution of 3.04 and containing 2.9 mol % of the propylene component.

Japanese Patent L-O-P Publn. No. 35007/1985 discloses a process wherein ethylene alone is polymerized, or ethylene and an α-olefin of 3 or more carbon atoms are copolymerized in the presence of a catalyst system containing a metallocene and a cyclic aluminoxane represented by the following formula

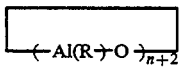

wherein R is an alkyl group of 1 to 5 carbon atoms, and n is an integer of 1 to about 20, or a linear aluminoxane represented by the following formula

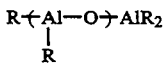

wherein R and n are as defined above.

According to this patent L-O-P publication, the polymers obtained in this manner have a weight average molecular weight of about 500 to about 1,400,000 and a molecular weight distribution of 1.5 to 4.0.

Japanese Patent L-O-P Publn. No. 35008/1985 discloses that polyethylene or ethylene/$C_3$–$C_{10}$ copolymers having a wide molecular weight distribution are prepared by using a catalyst system comprising at least two metallocenes and aluminoxane. This patent L-O-P publication indicates that the copolymers obtained in this manner have a molecular weight distribution ($\overline{Mw}/\overline{Mn}$) of 2–50.

Japanese Patent L-O-P Publns. Nos. 260602/1985 and 130604/1985 propose processes for polymerizing olefins by using catalysts formed from a mixed organoaluminum compound comprising a transition metal compound, aluminoxane and an organoaluminum compound, and disclose that polymerization activity per unit transition metal improves by the addition of the organoaluminum compound.

In every process cited hereinbefore, however, there was involved such a problem that activity per unit aluminoxane of the catalyst used is still low. Further, there was such a problem that it is difficult to obtain polymers having a sufficiently high molecular weight when olefins, for example, ethylene and propylene are copolymerized by using catalysts formed from the transition metal compounds and aluminoxanes hitherto known.

OBJECT OF THE INVENTION

The present invention is intended to solve such problems associated with the prior art as mentioned hereinbefore, and an object of the invention is to provide olefin polymerization catalysts which can give olefin polymers having a narrow molecular weight distribution when homopolymers of olefins are intended to be prepared, and which can give olefin copolymers having a narrow molecular weight distribution and a narrow composition distribution when copolymers of two or more olefins are intended to be prepared and, moreover, which have excellent polymerization activities even when amounts of aluminoxanes used therein are small and can easily give olefin polymers having a high molecular weight.

Another object of the invention is to provide processes for polymerizing olefins by using such olefin polymerization catalysts as mentioned above.

SUMMARY OF THE INVENTION

A first olefin polymerization catalyst of the present invention is formed characteristically from:
 [A] a compound of a transition metal belonging to Group IV B of the periodic table,
 [B] an aluminoxane, and
 [C] water.

A second olefin polymerization catalyst of the present invention is formed characteristically from:
 [A] a compound of a transition metal belonging to Group IV B of the periodic table,
 [B] an aluminoxane,
 [C] water and
 [D] an organoaluminum compound.

A first process for the polymerization of olefins of the present invention has its characteristic feature in that the olefins are polymerized or copolymerized in the presence of a catalyst formed from:
 [A] a compound of a transition metal belonging to Group IV B of the periodic table,
 [B] an aluminoxane, and
 [C] water.

A second process for the polymerization of olefins of the present invention has its characteristic feature in that the olefins are polymerized or copolymerized in the presence of a catalyst formed from:
 [A] a compound of a transition metal belonging to Group IV B of the periodic table,

[B] an aluminoxane,
[C] water and
[D] an organoaluminum compound.

DETAILED DESCRIPTION OF THE INVENTION

The olefin polymerization catalysts of the present invention and the processes for the polymerization of olefins using said olefin polymerization catalysts are illustrated below in detail.

In the present invention, the term "polymerization" is sometimes used in a sense that it includes not only homopolymerization but also copolymerization, and also the term "polymer" is sometimes used in a sense that it includes not only homopolymer but also copolymer.

The first olefin polymerization catalyst of the present invention, which is formed from three catalyst components [A], [B] and [C] as mentioned above, is now illustrated below in detail.

The catalyst component [A] used in the olefin polymerization catalyst of the present invention is a compound of a transition metal belonging to Group IV B of the periodic table and selected from titanium, zirconium, and hafnium in the concrete. Of the transition metals used in the catalyst component [A], preferred are titanium and zirconium and particularly preferred is zirconium.

As a compound of a transition metal belonging to Group IV B of the periodic table used in the catalyst component [A], there may be mentioned preferably a zirconium compound containing a group having a conjugated π electron as a ligand.

Examples of the zirconium compound containing a group having a conjugated π electron as a ligand are compounds represented by the following formula (I)

wherein $R^1$ is a cycloalkadienyl group, $R^2$, $R^3$ and $R^4$ are individually a cycloalkadienyl group, an aryl group, an alkyl group, an aralkyl group, a halogen or hydrogen atom, k is not less than 1, and k+l+m+n is 4.

Examples of the cycloalkadienyl group are, for example, cyclopentadienyl, methylcyclopentadienyl, ethylcyclopentadienyl, t-butylcyclopentadienyl, dimethylcyclopentadienyl, pentamethylcyclopentadienyl, indenyl and tetrahydroindenyl groups. Examples of the alkyl group represented by $R^2$, $R^3$ and $R^4$ are for example methyl, ethyl, propyl, isopropyl and butyl groups. Examples of the aryl group are, for example, phenyl and tolyl groups. Examples of the aralkyl group are, for example, benzyl, neophyl groups. The halogen atom may include, for example, fluorine, chlorine and bromine.

Examples of the zirconium compound containing a group having a conjugated π electron as a ligand include:
bis(cyclopentadienyl)zirconium monochloride monohydride,
bis(cyclopentadienyl )zirconium monobromide monohydride,
bis(cyclopentadienyl )methylzirconium hydride,
bis(cyclopentadienyl )ethylzirconium hydride,
bis(cyclopentadienyl )phenylzirconium hydride,
bis(cyclopentadienyl )benzylzirconium hydride,
bis(cyclopentadienyl)neopentylzirconium hydride,
bis(methylcyclopentadienyl)zirconium monochloride hydride,
bis(indenyl)zirconium monochloride monohydride,
bis(cyclopentadienyl)zirconium dichloride,
bis(cyclopentadienyl)zirconium dibromide,
bis(cyclopentadienyl)methylzirconium monochloride,
bis(cyclopentadienyl)ethylzirconium monochloride,
bis(cyclopentadienyl)cyclohexylzirconium monochloride,
bis(cyclopentadienyl)phenylzirconium monochloride,
bis(cyclopentadienyl)benzylzirconium monochloride,
bis(methylcyclopentadienyl)zirconium dichloride,
bis(t-butylcyclopentadienyl)zirconium dichloride,
bis(pentamethylcyclopentadienyl)zirconium dichloride,
bis(indenyl)zirconium dichloride,
bis(indenyl)zirconium dibromide,
bis(cyclopentadienyl)zirconium methyl,
bis(cyclopentadienyl)zirconium diphenyl, and
bis(cyclopentadienyl)zirconium dibenzyl.

Further, the zirconium compound used as the catalyst component [A] of the olefin polymerization catalyst of the present invention may includes zirconium compounds containing as a ligand a multidentate compound in which at least two groups selected from the group consisting of an indenyl group, a substituted indenyl group and partial hydrides thereof are bonded to each other via a lower alkylene group. Examples of such zirconium compounds as mentioned above include:
ethylenebis(indenyl)dimethylzirconium,
ethylenebis(indenyl)diethylzirconium,
ethylenebis(indenyl)diphenylzirconium,
ethylenebis(indenyl)methylzirconium monochloride,
ethylenebis(indenyl)ethylzirconium monochloride,
ethylenebis(indenyl)methylzirconium monobromide,
ethylenebis(indenyl)zirconium dichloride,
ethylenebis(indenyl)zirconium dibromide,
ethylenebis(4,5,6,7-tetrahydro-1-indenyl)dimethyl-zirconium,
ethylenebis(4,5,6,7-tetrahydro-1-indenyl)methylzirconium monochloride,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride, and
ethylenebis(4,7-dimethoxy-1-indenyl)zirconium dichloride.

Furthermore, there can also be used such compounds of transition metals as obtained by substituting the zirconium metal in the above-mentioned zirconium compounds with titanium or hafnium metal.

The catalyst component [B] used in the olefin polymerization catalyst of the present invention is an aluminoxane. The aluminoxane used as a catalyst component may be, for example, an organoaluminum compound represented by the following general formula (II) (III).

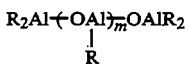  (II)

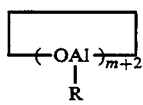  (III)

In the aluminoxane of the general formula (II) or (III), R is a hydrocarbon group such as methyl, ethyl, propyl or butyl, preferably the methyl or ethyl, particularly preferred is the methyl group, and m is an integer of at least 2, preferably 5–40. This aluminoxane as illustrated above may be formed from mixed alkyloxyaluminum units comprising an alkyloxyaluminum unit of the formula

and an alkyloxyaluminum unit of the formula

wherein $R^1$ and $R^2$ may represent the same hydrocarbon group as in R of the general formula (II) or (III) and $R^1$ and $R^2$ represent different hydrocarbon groups. In this case, preferred aluminoxanes are those formed from the mixed alkyloxyaluminum units containing at least 30 mol %, preferably at least 50 mol %, more preferably at least 70 mol % of a methyloxyaluminum unit

The aluminoxane as mentioned above may be prepared, for example, by the following methods.

(1) A method which comprises reacting a suspension of a compound containing water of absorption or a salt containing water of crystallization, such as magnesium chloride hydrate, copper sulfate hydrate, aluminum sulfate hydrate, nickel sulfate hydrate or cerous chloride hydrate, in a hydrocarbon medium with a trialkylaluminum.

(2) A method which comprises reacting a trialkyl aluminum directly with water in a medium such as benzene, toluene, ethyl ether or tetrahydrofuran.

Of the methods mentioned above, preferred is the method (1). The aluminoxane prepared by these methods may contain small amounts of organometallic components.

The catalyst component [C] used in the olefin polymerization catalyst of the present invention is water, and this water may be, for example, water dissolved or dispersed in such polymerization solvents as will be mentioned later, or water contained in the compounds or salts used in the preparation of the catalyst component [B].

In the manner now described, the first olefin polymerization catalyst of the present invention is formed from [A] a compound of a transition metal belonging to Group IV B of the periodic table, [B] an aluminoxane and [C] water. The catalyst of the type may be prepared by a process which comprises mixing the catalyst components [A], [B] and [C] together simultaneously in a hydrocarbon or olefin medium, or a process which comprises first mixing the two catalyst components together to prepare a mixture and then mixing the mixture with the remaining one catalyst component. In preparing the mixture of two catalyst components, it is preferable to first mix the catalyst component [B] with the catalyst component [C].

In preliminarily mixing the catalyst component [B] with the catalyst component [C], a concentration of the aluminoxane in terms of aluminum atom is usually $5 \times 10^{-4}$ to 3 gram atom/l, preferably $1 \times 10^{-3}$ to 2 gram atom/l, and a concentration of water is usually $2.5 \times 10^{-5}$ to 2 mole/l, preferably $5 \times 10^{-5}$ to 1.5 mole/l. A mixing molar ratio of aluminum atom to water ($Al/H_2O$) is 0.5 to 50, preferably 1 to 40. The temperature at which the preliminary mixing is carried out is usually $-50°$ to $100°$ C., and the mixing time is usually 0.1 minute to 200 hours.

An atomic ratio of a transition metal constituting the catalyst component [A] to aluminum constituting the aluminoxane (Al/transition metal) is usually 20 to $1 \times 10^4$ preferably 50 to $5 \times 10^3$ a concentration of the transition metal atom is usually $1 \times 10^{-8}$ to $1.5 \times 10^{-1}$ gram atom/l, preferably $1 \times 10^{-7}$ to $1 \times 10^{-1}$ gram atom/l, and a concentration of aluminum atom is usually $5 \times 10^{-5}$ to 3 gram atom/l, preferably $1 \times 10^{-4}$ to 2 gram atom/l. In mixing the preliminary mixture of the catalyst components [B] and [C] with the catalyst component [A], the temperature employed is usually $-50°$ to $200°$ C., and the mixing time is usually 0.1 minute to 50 hours.

Hereinafter, the second olefin polymerization catalyst of the present invention is illustrated. This olefin polymerization catalyst is formed from [D] an organoaluminum compound in addition to [A] the compound of a transition metal belonging to Group IV B of the periodic table, [B] the aluminoxane and [C] water as mentioned above.

Usable as the organoaluminum compounds as mentioned above are concretely such compounds as listed below.

Trialkylaluminum such as trimethylaluminum, triethylaluminum, triisopropylaluminum, triisobutylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, trioctylaluminum, etc.

Tricycloalkylaluminum such as tricyclohexylaluminum, and triarylaluminum such as triphenylaluminum, tritolylaluminum, etc.

Alkenyl aluminum such as isoprenylaluminum.

Dialkylaluminum hydride such as diisobutylaluminum hydride, alkylaluminum alkoxide such as isobutylaluminum methoxide, isobutylaluminum ethoxide, isobutylaluminum isopropoxide, etc., and dialkylaluminum halide such as dimethylaluminum chloride, diethylaluminum chloride, diisopropylaluminum chloride, diisobutylaluminum chloride, dimethylaluminum bromide, etc.

Alkylaluminum sesquihalide such as methylaluminum sesquichloride, ethylaluminum sesquichloride, isopropylaluminum sesquichloride, isobutylaluminum sesquichloride, ethylaluminum sesquichloride, etc.

Alkylaluminum dihalide such as methylaluminum dichloride, ethylaluminum dichloride, isopropylaluminum dichloride, isobutylaluminum dichloride, ethylaluminum dibromide, etc.

Of the organoaluminum compounds mentioned above, preferred are trialkylaluminum and, in addition, trialkylaluminum having a hydrocarbon group other than n-alkyl group. Concretely, preferred are triisopropylaluminum, triisobutylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum.

Moreover, such compounds from which the above-mentioned organoaluminum compounds are formed in the polymerization system, for example, as halogenated aluminum and alkyl lithium, or halogenated aluminum and alkylmagnesium, may also be used as the catalyst component [D].

The catalyst of the type may be prepared by a process which comprises mixing together simultaneously all the catalyst components [A], [B], [C] and [D] in a hydrocarbon or olefin medium, a process which comprises preliminarily mixing together the two catalyst components to prepare a mixture and then mixing the mixture with the remaining two catalyst components, or a process which comprises preliminarily mixing together the three catalyst components to prepare a mixture and then mixing the mixture with the remaining one catalyst component. In these cases, preliminarily mixing the catalyst component [B] with the catalyst component [C] is preferred.

In the same manner as in the case of the aforesaid first olefin polymerization catalyst of the present invention, a concentration of the aluminoxane in terms of aluminum atom used in preliminarily mixing together the catalyst components [B] and [C] is usually $5\times 10^{-4}$ to 3 gram atom/l, preferably $1\times 10^{-3}$ to 2 gram atom/l, a concentration of water is usually $2.5\times 10^{-8}$ to 2 mole/l, preferably $5\times 10^{-5}$ to 1.5 mole/l, and a mixing molar ratio of aluminum atom to water (Al/H$_2$O) is 0.5 to 50, preferably 1 to 40. The temperature at which the preliminary mixing is carried out is usually $-50°$ to $100°$ C., and the mixing time is usually 0.1 minute to 200 hours.

In mixing the catalyst component [A] with the preliminary mixture of the catalyst components [B] and [C], said catalyst component [A] is used in such an amount that a concentration of transition metal atoms constituting the catalyst component [A] is usually $5\times 10^{-6}$ to $1.5\times 10^{-1}$ gram atom/l, preferably $1\times 10^{-5}$ to $1\times 10^{-1}$ gram atom/l. The temperature at which the catalyst component [A] is mixed with the preliminary mixture of the catalyst components [B] and [C], is usually $-50°$ to $100°$ C., and the mixing time Is usually 0.1 minute to 50 hours.

The catalyst component [D] is used in such an amount that the aluminum atoms originated from the catalyst component [D] are 30-99%, preferably 40-98% and more preferably 50-95% based on the sum total of the aluminum atoms originated from the aluminoxane as the catalyst component [B] and the aluminum atoms originated from the organoaluminum compound as the catalyst component [D]. In other words, the catalyst component [B] is used in such an amount that the aluminum atoms originated from the catalyst component [B] are 1-70%, preferably 2-60% and more preferably 5-50% based on the sum total of the aluminum atoms originated from the catalyst components [B] and [D].

In the second olefin polymerization catalyst of the present invention, a ratio of the sum total of the aluminum atoms originated from the catalyst components [B] and [D] to the transition metal atoms originated from the catalyst component [A] is usually 20-10,000, preferably 50-5,000 and more preferably 100-2,000.

In the present invention, when polymerization of olefins is carried out by using the above-mentioned first or second olefin polymerization catalyst of the present invention, the catalyst component [A] present in the polymerization system is used in such an amount that the concentration of transition metal originated from said catalyst component [A] in the polymerization system is $1\times 10^{-8} \sim 1\times 10^{-2}$ gram atom/l preferably $1\times 10^{-7} \sim 1\times 10^{-3}$ gram atom/l, and the catalyst component [B] present in the polymerization system is used in such an amount that the aluminum atoms originated from said catalyst component [B] in the polymerization system are less than 3 milligram atom/l, preferably 0.01-2 milligram atom/l and more preferably 0.02-1 milligram atom/l.

The above-mentioned olefin polymerization catalysts may be used as solid catalysts by supporting the catalysts components on particulate inorganic compounds such as silica and alumina or on organic compounds such as polyethylene, polypropylene and polystyrene.

The olefin polymerization catalysts of the present invention as illustrated hereinbefore are used in the preparation of olefin polymers. Olefins which can be polymerized by the use of the olefin polymerization catalysts of the present invention include ethylene and α-olefins of 3 to 20 carbon atoms, for example, propylene, 1-butene, 1-pentene, 1-hexene, 4-methyl-1-pentene, 1-octene, 1-decene, 1-dodecene, 1-tetradecene, 1-hexadecene, 1-octadecene and 1-eicocane. If necessary, polyenes such as diene may copolymerized with the olefins mentioned above.

Polymerization reaction of olefins using the olefin polymerization catalysts of the present invention is carried out usually in the gas phase or the liquid phase, for example, In solution. When the polymerization reaction is carried out in the liquid phase, an inert hydrocarbon may be used as a solvent, or the olefin itself may be used as a solvent.

The hydrocarbons used as solvents in the above polymerization reaction include concretely aliphatic hydrocarbons such as butane, isobutane, pentene, hexane, heptane, octane, decane, dodecane, hexadecane and octadecane, allcyclic hydrocarbons such as cyclopentane, methylcyclopentane, cyclohexane and cyclooctane, aromatic hydrocarbons such as benzene, toluene and xylene, and petroleum fractions such as gasoline, kerosine and light oil.

The temperature at which the polymerization of olefins using the olefin polymerization catalysts of the present invention is carried out is usually $-50°$ to $200°$ C. preferably $0°-120°$ C. The polymerization pressure employed in that case is usually from atmospheric pressure to 100 kg/cm$^2$, preferably from atmospheric pressure to 50 kg/cm$^2$, and the polymerization reaction may be carried out batchwise, semicontinuously or continuously. Further, the reaction may be carried out in two or more steps under different reaction conditions. A molecular weight of the olefin polymers obtained may be regulated by means of hydrogen and/or polymerization temperature employed.

EFFECT OF THE INVENTION

In cases where olefins are homopolymerized by using the olefin polymerization catalysts of the present invention, olefin polymers having a high molecular weight and a narrow molecular weight distribution can be obtained. In cases where two or more olefins are copolymerized by using such olefin polymerization catalysts as mentioned above, olefin copolymers having a narrow molecular weight distribution, a narrow composition distribution and a high molecular weight can be obtained. Furthermore, the catalysts according to the invention have high catalytic activity and thus, the amount of aluminoxane used may be reduced.

The present invention is illustrated below in detail with reference to examples, but it should be construed that the invention is in no way limited to those examples.

In the following examples, values of $\overline{M}w/\overline{M}n$ were determined by the following procedure in accordance with Takeuchi, "Gel Permeation Chromatography", Maruzen, Tokyo.

(1) Using a standard polystyrene having the known molecular weight (a monodispersed polystyrene produced and sold by Toyo Soda K.K.), molecular weight and GPC (Gel Permeation Chromatography) count of the sample are measured to prepare a correlation diagram calibration curve of the molecular weight M and EV (Elution Volume). The concentration of the sample used is maintained at 0.02% by weight.

(2) GPC chromatograph of the sample is taken by GPC measurement, and a number average molecular weight $\overline{M}n$ and a weight average molecular weight $\overline{M}w$, in terms of polystyrene, are calculated from the calibration curve mentioned in the above procedure (1) to obtain a value of $\overline{M}w/\overline{M}n$. In that case, the conditions under which the sample is prepared, and the conditions under which GPC measurement is conducted are as follows:

Preparation of Sample (a) The sample is put in an Erlenmeyer flask together with O-dichlorobenzene so that the sample amounts of 0.1% by weight.

(b) The Erlenmeyer flask is heated at 140° C. and stirred for about 30 minutes to dissolve the sample in o-dichlorobenzene.

(c) The filtered solution of the o-dichlorobenzene is subjected to GPC.

GPC Measurement Conditions

The measurement was conducted under the following conditions.

| | |
|---|---|
| (a) Apparatus | 150C-ALC/GPC manufactured by Waters Co. |
| (b) Column | GMH Type manufactured by Toyo Soda K.K. |
| (c) Amount of sample | 400 μl |
| (d) Temperature | 140° C. |
| (e) Flow rate | 1 ml/min |

Further, value B of the ethylene copolymer obtained by the present invention is defined as follows:

$$B = \frac{P_{OE}}{2P_O \cdot P_E}$$

wherein $P_E$ represents a molar fraction of an ethylene component contained in the copolymer, $P_O$ represents a molar fraction of an α-olefin component contained in the copolymer, and $P_{OE}$ represents a molar fraction of an α-olefin-ethylene chain of the total dyad chain.

This value B is an index showing the state of distribution of monomers in the copolymer chain, and is calculated by obtaining the above-defined $P_E$, $P_C$ and $P_{OE}$ on the basis of reports of G. J. Ray (Macromolecules, 10, 773 (1977), J. C. Randall (Macromolecules, 15, 353 (1982), J. Polymer Science, Polymer Physics Ed., 11, 275 (1973) and K. Kimura (Polymer, 25, 441 (1984). The larger is the above-mentioned value B of the copolymer, the lesser is a block-like chain of the copolymer, and the distribution of ethylene and α-olefin is uniform, thus this indicates that the copolymer having a large value B has a narrow composition distribution.

The value B is calculated by such a procedure that $^{13}$C-NMR spectrum of the sample obtained by dissolving homogeneously about 200 mg of a copolymer in 1 ml of hexachlorobutadiene in a 10 mm φ test tube is measured usually under the measurement conditions of the measurement temperature of 120° C., measurement frequency of 25.05 MHz, spectrum width of 1500 Hz, filter width of 1500 Hz, pulse repeating time of 4.2 sec, pulse width of 7 μsec, and integrating time of 2000–5000 times, and $P_E$, $P_O$ and $P_{OE}$ are obtained from this spectrum.

Further, the amount of a n-decane soluble portion of the ethylene copolymer obtained by the present invention (the smaller is the amount of a n-soluble portion, the narrower is the composition distribution of the copolymer) was measured by dissolving about 3 g of said ethylene copolymer in 450 ml of n-decane at 145° C., cooling the solution to 23° C., removing a n-decane insoluble portion by filtration, and recovering a n-decane soluble portion from the filtrate.

EXAMPLE 1

Preparation of aluminoxane

A 400 ml thoroughly nitrogen-purged flask was charged with 37 g of $Al_2(SO_4)_3 \cdot 14H_2O$ and 125 ml of toluene, and then cooled to 0° C. Then, 500 mmoles of trimethylaluminum diluted with 125 ml of toluene was added dropwise. The temperature of the flask was then elevated to 40° C., and the reaction was continued at this temperature for 10 hours. After completion of the reaction, the reaction mixture was subjected to solid-liquid separation by filtration. The toluene was removed from the filtrate to give 12 g of aluminoxane as a white solid. The aluminoxane thus obtained was dissolved again in toluene, and the solution was used for the preparation of catalysts and for carrying out the polymerization.

The aluminoxane thus prepared had a molecular weight of 870 as determined by freezing point depression in benzene, and the m value in the catalyst component [B] was 13.

Preparation of catalyst and polymerization

A 1.5 liter glass autoclave thoroughly purged with nitrogen was charged with 500 ml of toluene containing 0.50 mmole of water and 500 ml of 4-methyl-1-pentene, and then elevated to 50° C. Successively, the aluminoxane as prepared above was added in an amount of 5 milligrams in terms of aluminum atom, and stirred at 50° C. for minutes. Thereafter, 0.02 mmol of bis(cyclopentadienyl)-zirconium dichloride was added to initiate the polymerization. The polymerization was carried out under atmospheric pressure at 50° C. for 2 hours, and then 20 ml of water was added to stop the polymerization. After removing the residual catalyst by hydrochloric acid and water, the toluene and unpolymerized 4-methyl-1-pentene were removed by using an evaporator, followed by vacuum drying at 120° C. overnight. As the result, there was obtained 62 g of liquid poly-4-methyl-1-pentene having $\overline{Mn}=1800$ and $\overline{Mw}/\overline{Mn}=2.20$.

COMPARATIVE EXAMPLE 1

An olefin polymerization catalyst was prepared in the same manner as in Example 1 except that 500 ml of toluene containing no water was used. Under this catalyst, 4-methyl-1-pentene was polymerized in the same manner as in Example 1 to give 48 g of liquid poly-4-methyl-1-pentene having $\overline{Mn}=500$ and $\overline{Mw}/\overline{Mn}=2.15$.

EXAMPLES 2-3

Olefin polymerization catalysts were prepared by repeating Example 1 but using such components as shown in Table 1. Using the catalysts thus prepared, 4-methyl-1-pentene was polymerized in the same manner as in Example 1 to give liquid poly-4-methyl-1-pentene having properties as shown in Table 1.

TABLE 1

| Example | Catalyst component [A] Kind | mmole | Aluminoxane (mg atom Al) | Water (mmole) | Yield (g) | $\overline{Mn}$ | $\overline{Mw}/\overline{Mn}$ |
| --- | --- | --- | --- | --- | --- | --- | --- |
| 2 | Bis(cyclopentadienyl) zirconium dichloride | 0.02 | 5 | 0.25 | 66 | 1100 | 2.10 |
| 3 | Bis(methylcyclopentadienyl) zirconium dichloride | 0.02 | 5 | 0.50 | 69 | 1400 | 2.24 |

EXAMPLE 4

Preparation of catalyst and Polymerization

A 500 ml thoroughly nitrogen-purged glass autoclave was charged 250 ml of toluene containing 0.125 mmole of water and the aluminoxane prepared in Example 1 in an amount of 1.25 milligram atom in terms of aluminum atom, and then stirred at 25° C. for 10 minutes. Subsequently, a mixed gas of ethylene and propylene (60 l/hr and 40 l/hr, respectively) was introduced into the autoclave, and then stirred for 5 minutes. Thereafter, $5\times10^{-4}$ mmole of bis(cyclopentadienyl)zirconium dichloride was added to initiate polymerization. After carrying out the polymerization under atmospheric pressure at 25° C. for 30 minutes while feeding the above-mentioned mixed gas, a small amount of methanol was added to stop the polymerization. The polymer solution obtained was added to a large excess of methanol to precipitate the polymer, followed by vacuum drying at 130° C. for 12 hours. As the result, there was obtained 7.8 g of the polymer having MFR of 0.69 g/10 min, 88.2 mol % of the ethylene content as obtained by $^{13}$C-NMR, $\overline{Mw}/\overline{Mn}$ of 1.94 and value B of 1.12.

COMPARATIVE EXAMPLE 2

The same polymerization as in Example 4 was carried out except that there was used 250 ml of toluene containing no water, whereby 6.7 g of the polymer having MFR of 2.02 g/10 rain, the ethylene content of 91.5 mol %, $\overline{Mw}/\overline{Mn}$ of 1.98 and value B of 1.11.

EXAMPLE 5

Preparation of catalyst and polymerization

A 400 ml thoroughly nitrogen-purged glass flask was charged with 57 ml of toluene, 0.94 g of finely pulverized $Al_2(SO_4)_3.13H_2O$ and 50 ml of a toluene solution of the aluminoxane prepared in Example 1 (Al 2.14 mole/l), and the temperature of the flask was elevated to 40° C. to carry out the reaction for 72 hours. The slurry thus obtained was used in the following polymerization.

The same apparatus as in Example 4 was charged with 250 ml of toluene, and a mixed gas of ethylene and propylene (60 l/hr and 40 l/hr, respectively) was passed therethrough. Thereafter, 1.25 ml of the slurry obtained above and $5\times10^{-4}$ mmole of bis(cyclopentadienyl)zirconium dichloride were added to initiate the polymerization in the same manner as in Example 4, whereby 10.7 g of a polymer having MFR of 0.56 g/10 min, the ethylene content of 86.2 mol %, $\overline{Mw}/\overline{Mn}$ of 2.03 and value B of 1.12 was obtained.

EXAMPLE 6

The same polymerization as in Example 5 was carried out except that in place of the bis(cyclopentadienyl)zirconium dichloride used in Example 5, there was used bis(methylcyclopentadienyl)zirconium dichloride, whereby 10.2 g of a polymer having MFR of 0.49 g/10 min, the ethylene content of 86.9 mol %, $\overline{Mw}/\overline{Mn}$ of 2.11 and value B of 1.12.

EXAMPLE 7

A 400 ml thoroughly nitrogen-purged glass flask was charged with 57 ml of toluene, 0.94 g of finely pulverized $Al_2(SO_4)_3.13H_2O$ and 50 ml of a toluene solution of the aluminoxane obtained in the same manner as in Example 1 (Al 2.14 mole/l), and the temperature was elevated to 40° C. to carry out the reaction for 72 hours. The slurry thus obtained was used in the following polymerization.

A 2-liter stainless steel autoclave thoroughly purged with nitrogen was charged with 900 ml of 4-methyl-1-pentene and 1 mmole of triisobutylaluminum, and the temperature of the autoclave was raised to 100° C. Subsequently, 0.2 ml of the slurry obtained above and $8\times10^{-4}$ mmole of bis(methylcyclopentadienyl)zirconium dichloride were brought into contact with each other in 40 ml of cyclohexane for 2 minutes at room temperature and then introduced, together with ethylene, into the polymerization system to initiate polymerization. The polymerization was continued at the total pressure of 20 kg/cm² gauge for 40 minutes while continuously feeding the ethylene to the system. A small amount of methanol was added to stop the polymerization. The polymer solution is added to a large excess of methanol to precipitate a polymer, followed by vacuum drying at 80° C. for 12 hours. As the result, 111 g of the polymer having MFR of 1.6 g/10 min, density of 0.902 g/cm$^3$, $\overline{Mw}/\overline{Mn}$ of 2.14 and n-decane soluble portion of 1.6% by weight was obtained.

COMPARATIVE EXAMPLE 3

The same polymerization as in Example 7 was carried out except that 0.2 mg atom, in terms of aluminum atom, of the aluminoxane as prepared in Example 1 was used, as it was, without bringing it into contact with water, that is, without using Al$_2$(SO$_4$)$_3$.13H$_2$O, whereby 75 g of a polymer having MFR of 6.2 g/10 min, density of 0.904 g/cm$^3$, $\overline{Mw}/\overline{Mn}$ of 2.20 and n-decane soluble portion of 1.6% by weight.

EXAMPLES 8–10

The same polymerization of 4-methyl-1-pentene as in Example 7 was carried out except that catalysts each comprising catalyst components as shown in Table 2 were used, whereby such polymers as shown in Table 2 were obtained.

TABLE 2

(Result of polymerization)

| Example | Catalyst component [A] Kind | (mmole) | Aluminoxane* (ml) | Organoaluminum Kind | (mmole) | Yield (g) | MFR (g/10 min) | Density (g/m$^3$) | $\overline{Mw}/\overline{Mn}$ | Amount of n-Decane soluble portion (%) |
|---|---|---|---|---|---|---|---|---|---|---|
| 8 | Bis(cyclopentadienyl) zirconium dichloride | 2 × 10$^{-3}$ | 0.2 | Triisobutyl-aluminum | 1 | 74 | 2.8 | 0.903 | 2.29 | 1.7 |
| 9 | Bis(cyclopentadienyl) zirconium dichloride | 2 × 10$^{-3}$ | 0.2 | Tri(2-ethylhexyl)-aluminum | 1 | 69 | 2.5 | 0.902 | 2.34 | 1.8 |
| 10 | Bis(indenyl) zirconium dichloride | 8 × 10$^{-4}$ | 0.2 | Triisobutyl-aluminum | 0.5 | 76 | 4.1 | 0.904 | 2.45 | 2.0 |

*Slurry obtained in Example 7

EXAMPLE 11

A 400 ml glass flask thoroughly purged with nitrogen was charged with 57 ml of toluene, 0.47 g of Al$_2$(SO$_4$)$_3$.13H$_2$O and 50 ml of a toluene solution of an aluminoxane prepared in the same manner as in Example 1, and the reaction was carried out at 40° C. for 48 hours. To 10 ml of the slurry thus obtained were added 40 ml of toluene and 0.1 mmole of bis(cyclopentadienyl)zirconium dichloride, and they were brought into contact with one another at room temperature for 10 minutes. The polymerization was carried out in the same manner as in Example 7 by using 1.0 ml of the slurry thus treated and 1 mmole of triisobutylaluminum, whereby 88 g of a polymer having MFR of 2.1 g/10 min, density of 0.903 g/cm$^3$, $\overline{Mw}/\overline{Mn}$ of 2.31 and n-decane soluble portion of 1.6% by weight.

What is claimed is:

1. An olefin polymerization catalyst formed from
   (A) a compound of zirconium or hafnium containing a group having a conjugate $\pi$ electron as a ligand,
   (B) an aluminoxane, and
   (C) water;
   wherein the mixing molar ratio (Al/H$_2$O) of aluminum atom in the aluminoxane (B) to water (C) is from 0.5 to 50, the atomic ratio of aluminum in the aluminoxane (B) to zirconium or hafnium in the compound (A) is 20 to 1×10$^4$;
   wherein said catalyst is prepared by mixing said catalyst components (A), (B) and (C) together simultaneously in a hydrocarbon medium.

2. An olefin polymerization catalyst formed from
   (A) a compound of zirconium or hafnium containing a group having a conjugate $\pi$ electron as a ligand,
   (B) an aluminoxane, and
   (C) water;
   wherein the mixing molar ratio (Al/H$_2$O) of aluminum atom in the aluminoxane (B) to water (C) is from 0.5 to 50, the atomic ratio of aluminum in the aluminoxane (B) to zirconium or hafnium in the compound (A) is 20 to 1×10$^4$;
   wherein said catalyst is prepared by mixing said catalyst components (B) and (C) together in a hydrocarbon medium and then mixing said mixture with catalyst component (A).

3. An olefin polymerization catalyst formed from
   (A) a compound of zirconium or hafnium containing a group having a conjugate $\pi$ electron as a ligand,
   (B) an aluminoxane,
   (C) water, and
   (D) an organoaluminum compound selected from the group consisting of trialkylaluminum, tricycloalkylaluminum, alkenyl aluminum, dialkylaluminum hydride, alkylaluminum alkoxide, dialkylaluminum halide, alkylaluminum sesquihalide, and alkylaluminum dihalide;
   wherein the mixing molar ratio (Al/H$_2$O) of aluminum atom in the aluminoxane (B) to water (C) is from 0.5 to 50, a ratio of the sum total of the aluminum atoms originated from the catalyst components (B) and (D) to the transition metal atoms originated from the catalyst component (A) is 20 to 1×10$^4$;
   wherein said catalyst is prepared by mixing said catalyst components (A), (B), (C) and (D) together simultaneously in a hydrocarbon medium.

4. An olefin polymerization catalyst formed from
   (A) a compound of zirconium or hafnium containing a group having a conjugate $\pi$ electron as a ligand,
   (B) an aluminoxane,
   (C) water, and
   (D) an organoaluminum compound selected from the group consisting of trialkylaluminum, tricycloalkylaluminum, alkenyl aluminum, dialkylaluminum hydride, alkylaluminum alkoxide, dialkylaluminum halide, alkylaluminum sesquihalide, and alkylaluminum dihalide;
   wherein the mixing molar ratio (Al/H$_2$O) of aluminum atom in the aluminoxane (B) to water (C) is from 0.5 to 50, a ratio of the sum total of the aluminum atoms originated from the catalyst components (B) and (D) to the transition metal atoms originated from the catalyst component (A) is 20 to 1×10$^4$;
   wherein said catalyst is prepared by mixing said catalyst components (B) and (C) together in a hydrocarbon medium and then mixing said mixture with the remaining two catalyst components.

5. The catalyst according to claim 1, wherein said hydrocarbon medium is an olefin medium.

6. The catalyst according to claim 2, wherein said hydrocarbon medium is an olefin medium.

7. The catalyst according to claim 3, wherein said hydrocarbon medium is an olefin medium.

8. The catalyst according to claim 4, wherein said hydrocarbon medium is an olefin medium.

* * * * *